Feb. 23, 1954  A. R. C. MARKL  2,670,224
SPHERO-CONICALLY GENERATED FITTING
Filed Feb. 8, 1947  3 Sheets-Sheet 1
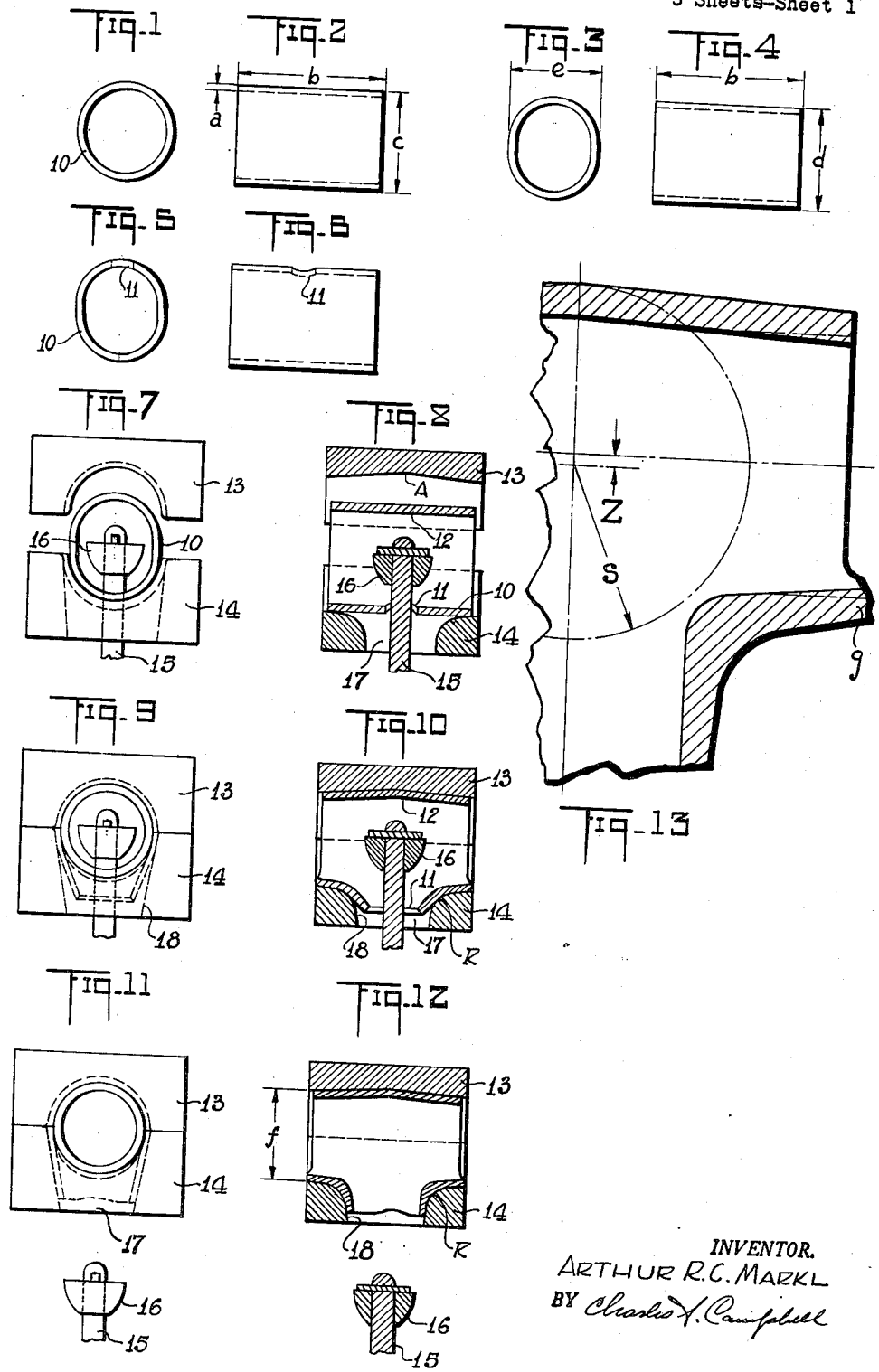
INVENTOR.
ARTHUR R.C. MARKL
BY Charles Y. Campbell
ATTORNEY.

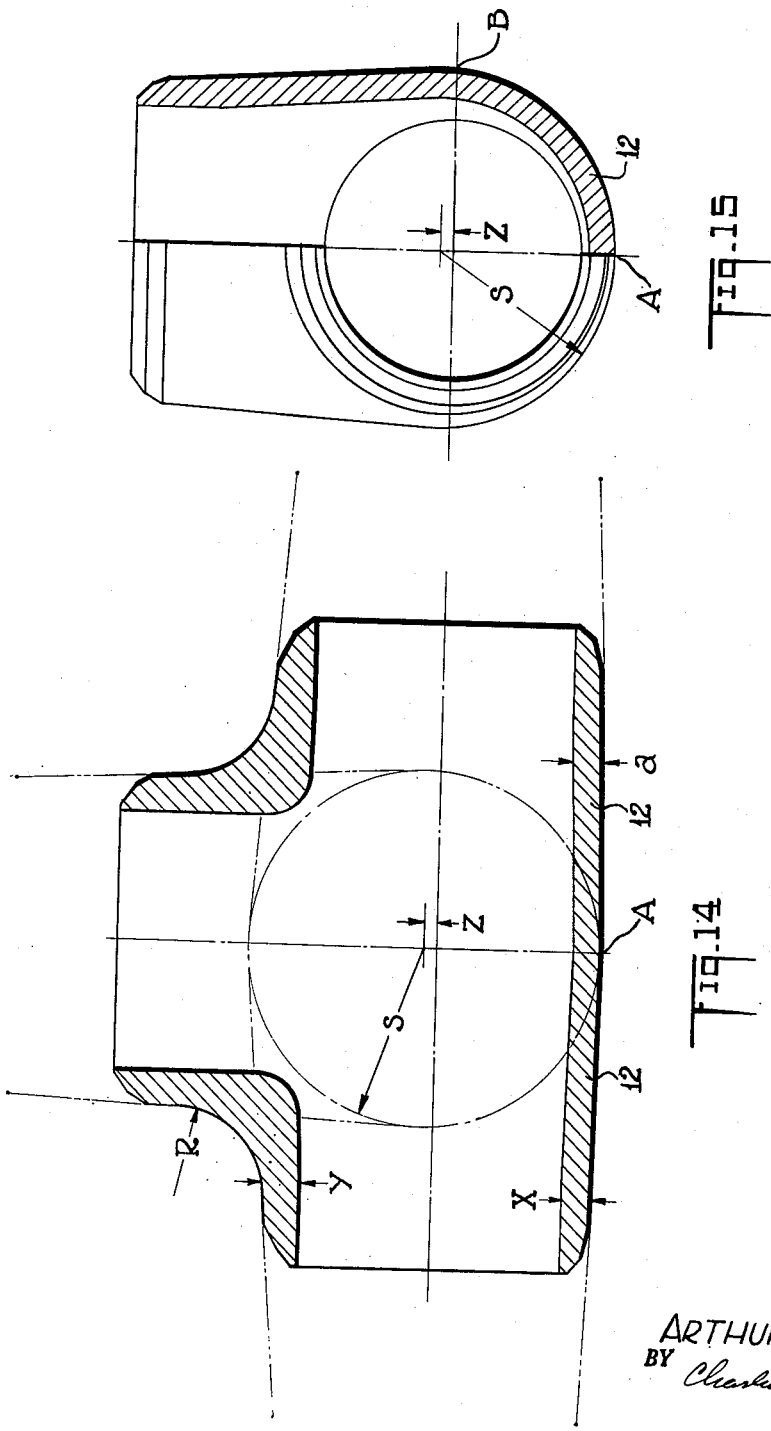

Feb. 23, 1954 A. R. C. MARKL 2,670,224
SPHERO-CONICALLY GENERATED FITTING
Filed Feb. 8, 1947 3 Sheets-Sheet 3
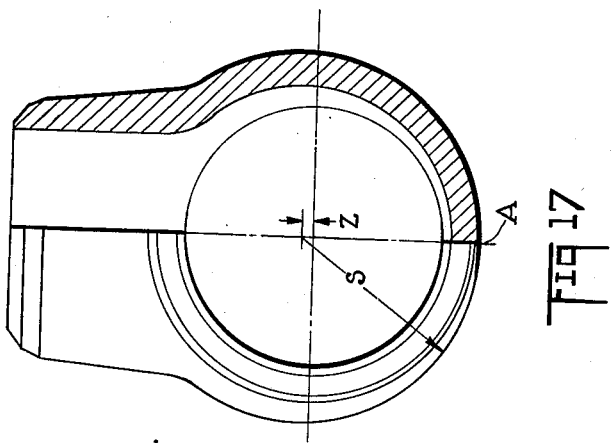
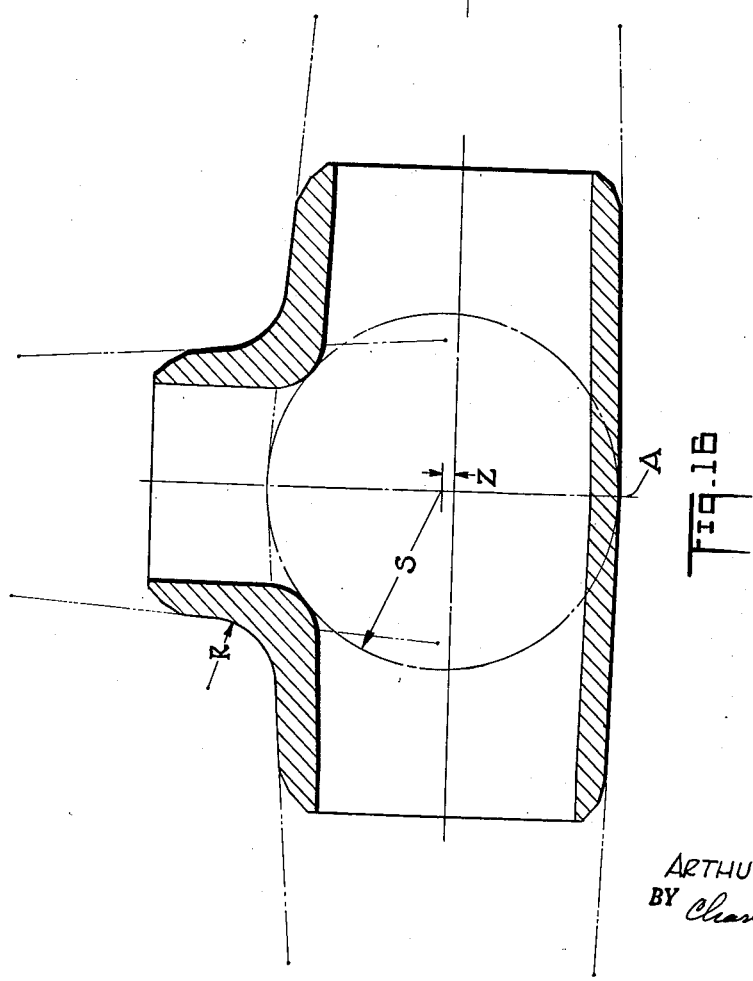
INVENTOR.
ARTHUR R. C. MARKL
BY Charles J. Campbell
ATTORNEY.

Patented Feb. 23, 1954

2,670,224

UNITED STATES PATENT OFFICE 2,670,224

SPHERO-CONICALLY GENERATED FITTING

Arthur R. C. Markl, Louisville, Ky., assignor, by mesne assignments, to National Cylinder Gas Company, Chicago, Ill., a corporation of Delaware Application February 8, 1947, Serial No. 727,412

10 Claims. (Cl. 285—210)

This invention relates to pipe fittings and the like, and more particularly to improvements in the structure and configuration of branched fittings such as T's, crosses, laterals and the like.

In the art of manufacturing pipe fittings, and particularly seamless welding fittings, the characteristics of the fitting have usually deviated from the optimum relationship of shape, size, weight, strength and flow conditions as a result of manufacturing limitations. In the case of fittings such as T's, crosses, Y's and laterals, having branch outlets made by drawing operations, it has been the practice heretofore to make the fittings unduly strong and heavy in some regions in order to insure sufficient strength at various critical regions, for example at the crotch of the neck or outlet. In the case of drawn seamless T's, especially, this practice is believed to have been due largely to the fact that in its manufacturing concept the art has adopted as a compromise the primitive shape defined by two intersecting right circular cylinders, since thereby a simpler manufacturing process could be used. Further manufacturing limitations are present in the case of fittings made by casting processes wherein it has been necessary to make the smaller sized fittings with wall thicknesses of disproportionately large size because of the requirements of the sand casting process. Even in the larger sized cast fittings, excessively heavy walls are customarily present because of metal porosity and the danger of core shifts during the casting operation.

Although various attempts have been made to provide fittings having wall thicknesses reinforced at selected points, as for example in the T shown by Olsen Patent 1,255,562 or the flow head shown by Reed Patent 1,989,608 or the bulged-out central portion of the T shown by Higgins Patent 977,740, nevertheless in each case the limitations of manufacture have resulted in articles having an excess of metal in some areas in order to insure the required strength in other areas.

An important object of the present invention, therefore, is the provision of improvements in the design and construction of branched fittings whereby there is afforded considerably greater bursting strength in proportion to the weight of the fittings than has been afforded by the same size of branched fittings of the prior art.

More particularly, it is an object of the invention to provide in the design and construction of branched fittings, improved configuration and improved distribution of material so that the theoretical optimum requirements for maximum strength with minimum weight of the fitting are closely approached.

In contrast with the less satisfactory compromise designs, especially the rough concept of intersecting right circular cylinders as hertofore generally employed in the construction of branched fittings, this invention provides as an important feature a branched fitting of spheroconical external form whose central body portion partakes of the shape of a sphere and whose outlets are generally in the form of truncated cones, and which fitting has a wall thickness ranging from a maximum in the region of the crotches where the branch outlet joins the main body to a minimum at points along the extremities of the outlets. A sphere has approximately twice the bursting strength of a cylinder having the same external diameter and the same wall thickness and it has been found that a conventional fitting when subjected to extremely high hydrostatic pressures actually tends to bulge out into a deformed spherical shape at its central portion. Hence in the practice of the present invention, the branched fitting initially is designed to have a shape closely approximating that which it can be expected to assume under conditions of extreme pressure use and then it is deliberately manufactured to that shape. The demands thereafter imposed upon the ductility of the material of the fitting during the first pressuring of the same when it is placed in use and during subsequent repressuring during its life are greatly reduced over the demands imposed on conventional fittings. Not only will the life of such improved fittings be longer, but also they can withstand greater peak pressures. Also in cases where vibration, unusual temperature changes, or corrosive fluids are encountered in use, these fittings are found to resist metal fatigue much better than the older types. Thus, by the present invention there is provided a fitting which not only has maximum strength with minimum weight, but also has a higher degree of safety and longer trouble-free service than fittings heretofore known to the art. Moreover, by following the teachings of the present invention, the fitting designer is afforded greater freedom and latitude of design while still meeting manufacturing process limitations.

A further object of the invention, therefore, is to provide an improved branch fitting which for a given weight and size of fitting will withstand a greater pressure than conventional fittings before evidence of yielding is noted.

A still further object is to provide an improved branch fitting which for a given weight and size of fitting will withstand a greater bending moment, such as is imposed in service as a result of weight loadings and line expansions.

Other objects and advantages will become more apparent in the following detailed description when considered in connection with the accompanying drawings in which;

Figures 1 and 2 are end and side views respectively of a section of tubular stock suitable for the manufacture of fittings in accordance with the invention;

Figures 3 and 4 are end and side views respectively of the section of stock following the first stage of treatment;

Figures 5 and 6 are end and side views respectively of the section of stock with an aperture formed therein at a desired location for the manufacture of a T;

Figures 7 and 8 are end and side views respectively showing the section of stock positioned within cooperating dies prior to the initial deforming step and indicating the relative position of the draw rod and expanding means later to be employed;

Figures 9 and 10 are end and side views respectively showing the section of stock within the dies following the closing of the dies and prior to the drawing operation;

Figures 11 and 12 are end and side views respectively showing the relative positions of the dies, a rough T formed therein, and the draw rod and expanding means following the drawing operation;

Figure 13 is a sectional view on a larger scale showing one-half of the rough T prior to finishing operations;

Figure 14 is a sectional view on a larger scale showing a finished straight T embodying the invention and illustrating the geometrical configurations thereof in greater detail;

Figure 15 is an end view partly in section showing the configuration of the T shown in Figure 14; and Figures 16 and 17 are sectional side and end views respectively showing on a larger scale a finished reducing T made in accordance with the invention.

Merely as one example of the invention, a tube section 10 such as shown in Figures 1 and 2 may be converted into an improved straight T such as shown in Figures 14 and 15. However, the invention is not limited to this single article or to the process or means of producing this single article, but on the contrary may readily be applied to the manufacture of improved crosses, Y's, laterals and other branched fittings. Likewise, certain features of the invention may be employed to advantage in connection with other processes for forming branched fittings, as in casting improved branched fittings or in forming the fitting by forging from solid billets or rods or by other metal working processes.

Referring first to Figures 14 and 15, certain distinctive features of the finished fitting will be noted. Each outlet has an external wall of conical shape, the importance of which will later be described in connection with the operation of the dies in forming the product. These conical external walls, if extended, preferably become tangent to a generating sphere, having a radius S, diagrammatically indicated in Fig. 14. The central external body portion of the fitting partakes of the form of that sphere, as best shown in Fig. 15. Moreover, in fittings in which a single outlet extends to one side, as in T's or laterals, the center of the sphere is offset from the center line of the bore of the run of the fitting. With the center of the sphere thus offset, as by a distance Z, it is geometrically possible to form the end walls of the run as truncated cones the circular outer wall of which is eccentric to the circular inner wall measured on planes normal to the axis of the run. In this construction the outer walls form a greater angle with the bore of the run on the side nearer the branch outlet than is formed therewith on the back side of the fitting. This results in the thickness of the wall of the run increasing in a plane near the end of the run from a minimum X on the back wall to a maximum Y at the wall adjacent the outlet side, as best shown in Fig. 14. As will be noted, a comparatively heavy section of metal therefore is provided at the crotches at the junction of the branch outlet and run of the fitting to strengthen the regions of the crotches where rupture of prior art fittings has frequently occurred. A much greater bending moment measured in the plane of the axes of the branch outlet and run can thus be safely withstood. Due to the movement of excess metal into the region of the crotches, during the manufacturing process, adequate metal is available to permit a comparatively large external radius R for the crotches adjacent the outlet. This is also a highly desirable manufacturing feature since the metal flowing into the crotches at or adjacent the branch outlet is in effect bent or laid around a large radius as it changes direction of flow. Not only are smaller pressures required by the dies but also the grain structure of the metal is improved by its comparatively smooth flow.

The degree to which such excess metal may be moved into a side of the fitting may be varied as desired by increasing or decreasing the value Z by which the center of the generating sphere is offset from the center line of the bore of the run of the fitting. Merely as an example, in the manufacture of six inch nominal pipe size straight T's, of the type shown in Figs. 14 and 15 and in six by six by four inch nominal pipe size reducing T's of the type shown in Figs. 16 and 17, a dimension Z of 0.169 inch will give satisfactory results.

In contrast with the non-uniform wall thicknesses of the run portions measured in planes normal to the axis of the run of the fitting, a uniform wall thickness measured in like planes normal to the axis of the branch is provided for the branch outlet of the illustrated fitting. In effect the external walls of the branch outlet or outlets for T's as well as crosses, are formed by right circular cones, which in the case of straight T's or crosses preferably are tangent to the generating sphere, as diagrammatically indicated on Figure 14, but which in the case of reducing T's and crosses are not tangent, as indicated in Figure 16. In view of these features and despite the fact that relatively little of the true spherical outer surface is readily apparent in the finally produced fitting it is felt that the term, sphero-conically generated fitting, most clearly defines the basic structure of the invention. As shown in the drawings, the sphero-conically generated fitting, made from a section of pipe such as shown in Figs. 1–6, in the formed fitting (both prior to Fig. 12, and after finishing, Figs. 14 and 16) has a run portion of barrel like shape. The exterior wall of the run portion has a shape such that the radii of the curvature of its outside surface progressively decreases toward the extremities from a maximum midway of the fitting. Stated differently, the exterior of the surface of the run portion is generally in the shape of two circular cones meeting at the center of the fitting in the regions respectively of their larger cross-sectional areas. The interior walls of the run portions are generally in the form of two coaxial truncated right circular cones with the larger ends of the cones also located centrally of the fitting, which is to say the larger ends of the cones converge midway of the fitting. Thus the interior of the run portions is also of generally barrel-like shape.

As a result of these considerations, it now becomes possible by conventional manufacturing processes, as for example those shown in Hodapp et al. Patent 2,290,965, to place the optimum amount of material of the stock employed at the locations where it will most efficiently be used during the service of the fitting.

Furthermore, various modifications of the thickness of the back wall of the fitting may be obtained by the use of selective heating or cooling, or both, in conjunction with the action of the dies in forming of the fitting. For example, in Figures 14 and 15, whereas the fitting normally would tend to decrease in back wall thickness longitudinally from point A to the extremities of the run and to increase in wall thickness from point A circumferentially to point B as a result of the manufacturing process now to be described, this tendency may be modified as desired by control of the temperature of the metal without departing from the invention.

Assuming that an improved seamless, straight welding T is to be made by a drawing operation using tubular stock with an outer diameter greater than the outer diameter of the ends of the T to be produced, a suitable section of stock 10, shown in Figs. 1 and 2, is provided. This stock, with an initial wall thickness $a$, outer diameter $c$ and length $b$, is then formed by any suitable method, either hot or cold, into a generally oval shape as shown in Figs. 3 and 4, having a long transverse axis $d$ and a short transverse axis $e$. After the axes are thus established, a suitable aperture 11 is formed in the wall of the section at one end of the long axis and at the location desired for the branch outlet, as indicated in Figs. 5 and 6, thus assuring that the aperture will be properly located with respect to later cooperation of said section with the forming dies.

Depending upon the nature of the material forming the tube section, the thickness of the wall $a$ and the characteristics desired in the final fitting, such section may be processed hot or cold, or heated or cooled in selected areas, at the time the forming operations are conducted. For example, if a metal T of standard wall thickness, such as shown in Figures 14 and 15, is desired, the back wall of the section may be processed cooler than the remainder of the section. The section then is placed between cooperating dies 13 and 14 as shown in Figures 7 and 8, and prior to or after partial or full closing of the dies, a draw rod 15 is inserted through the aperture 11 in the section and an expanding means 16 is securely affixed to said rod. As will be noted from Figure 8, the upper inner wall of die 13 which is to form back wall 12 of the fitting is sloped to provide the desired conical angles extending outwardly and circumferentially from point A. Similarly the lower inner wall of die 14 is sloped to form complementary conical angles outwardly and circumferentially as shown by the arcuate broken lines in Figure 7.

With the section in position in the dies, the dies then are brought together whereupon several significant changes in the disposition of metal of the section occur. Of particular importance is the action of the inclined conical surfaces of the dies used for forming the external walls at the ends of the run. These conical surfaces provide more open space for metal to flow toward the central body portion and branch outlet area, and simultaneously restrain, without completely trapping, metal tending to flow toward the ends of the run. A smooth and easily controlled metal flow with an improved grain structure of the metal and without application of excessive pressures or danger of folding of metal into the unsupported interior of the section thus results. The outer ends of the oval section are the first regions of the section to be reformed into a circular shape by the dies and since the original outer diameter $c$ of the section is reduced to a smaller outer diameter $f$ in the final fitting, the resulting excess metal is progressively moved primarily into the region around the aperture 11 of the section and the outlet 17 in the lower die 14. Depending upon the relative temperatures of the several portions of the section used in cooperation with the metal flow normally induced by the action of the dies, metal may also be placed, as desired, circumferentially of the fitting in order to make a greater wall thickness, Fig. 15, at point B on the side than at point A on the back wall or to make the same wall thickness at these two points. Moreover, if a mere bending action of the back wall of the section is desired so as to provide a uniform back wall thickness, of the same amount $a$ as the original section, as shown in Figs. 2 and 14, a sufficient chilling of the portion of a heated section along its back wall will produce a bending rather than upsetting action thereon during the closing of the dies. With sufficient chilling of the entire back half of a heated section, the wall thickness at point B can be maintained the same as at point A, if this be desired, thus providing even more excess metal for strengthening of the branch outlet region.

Referring now to Figures 9 and 10, as the dies close, the small aperture 11 of the section 10 is stretched into an appreciably larger aperture suitable for expansion by the expanding means 16. Meanwhile the extremities of the run of the fitting have been formed and the metal required for the thickened crotch of large radius R has been moved into position for the final forming operation.

After the dies 13 and 14 both engage the tubular blank, expanding means 16 is drawn outwardly through outlet 17 in die 14, as shown in Figures 11 and 12, thus forming the branch of the T. During this movement the aperture 11 in the original section is further expanded and the excess metal which had been moved into the region near outlet 17 is bent and pulled downwardly and laid against the conical surface 18 in lower die 14. Thereupon dies 13 and 14 are opened and the rough fitting, one half of which is shown in Figure 13, is removed for finishing operations.

The rough fitting thus formed will have generally a short, thick wall section $g$ extending axially outwardly on each extremity of the run and located on the side having the thicker wall. The branch outlet, however, will usually taper to a narrower wall thickness and the outlet extremity will present a jagged peripheral configuration. The interior wall at the ends of the run of the fitting will exhibit a definite conical shape similar to the conical shape of the exterior wall, while the interior wall of the branch outlet, formed by the movement of expanding means 16, will be cylindrical and the exterior wall thereof will be conical. Moreover, the wall thickness of such outlet, measured on a plane normal to the axis of the outlet, will be substantially uniform.

In finishing the above described rough fitting to produce the fitting shown in Figure 14, a boring axis is established which as shown in Figure 13 will pass a distance Z above the center of the generating sphere S. A suitable boring tool then is inserted in each end of the run of the fitting to remove metal to the desired degree, as indicated by the horizontal broken lines shown in the metal section. In contrast with past manufacturing operations in which the boring tool frequently removed metal through a substantial length of the run of the fitting, it is necessary in the present invention to move the tool only to the point where the inner diameter of the conical walls becomes equal to the diameter of the bore being established. A substantial saving in scrap metal and operating time is thus achieved.

After the boring of the run is completed the rough fitting is then measured, marked and machined to produce an article having the desired lands and bevels suitable for welding to piping, as for example the finished article of Figs. 14 and 15. It will be observed from Figs. 14 and 15 that with the center for the two circles spaced a distance Z from the axis of the bore the circle with radius S of Fig. 15 defines a substantial portion of the external surface of the fitting in the region of meeting of the two conical run portions. The distribution of metal in the fitting and its shape give rise to another characteristic particularly well illustrated in Fig. 14. As earlier pointed out in connection with Fig. 8, the upper, inner wall of die 13 which forms the back wall 12 of the fitting is sloped to provide the desired conical shapes extending outwardly, and circumferentially, from the region of point A. It has further been specified that the outer wall on the branch side of the fitting extends at a greater angle with the bore of the run than is formed on the back side thereof. The difference is made apparent in Fig. 14 by the broken lines and thus establishes, for the two conical shapes forming the run portions, axes of revolution which meet at the center for radii S of Fig. 14 and are inclined toward the center line of the bore through the run portions.

By means of the invention, sphero-conically generated fittings having advantages not heretofore obtainable are now made possible. Comparative tests conducted upon representative six inch seamless metal T's taken from commercial stocks indicate that the invention gives an increase of 16% or more in bursting strength for T's of equal weight. At the same time the tests show an increase of 22% or more in pressures withstood before evidence of yielding is noted. Moreover, it is found that the cyclically reversed bending moment which can be transmitted through the branch to the run is about 19% greater. Conversely, for equal bending moments, the fitting will withstand a greater number of stress reversals than conventional designs.

These fittings can be made from stock of any desired schedule of wall thicknesses, and, in the case of T's, uniform center to face dimensions can be secured as desired. Whenever required, the sides of the central body of the fitting can be given increased wall thickness merely by selective application of differential temperatures in the tube section being employed as stock.

Although I have disclosed as representative of the invention the manufacture of a straight T, it will be obvious that reducing outlet T's, and both full size and reducing outlet crosses, Y's and laterals may be made by the use of appropriate dies and without departing from my invention. Such a reducing T is shown in Figures 16 and 17 and may be made by the process steps as outlined in the production of the straight T, using dies however which are proportioned to the reducing T dimensions.

Having thus described the invention, I claim:

1. A branched pipe fitting having two run portions and a branch portion forming a hollow body, the exterior of each of which portions is of generally circular conical form, and all of which portions converge at their larger ends to form a hollow body with the smaller ends of said portions constituting their outer extremities, each of said portions having a bore with an outlet at said outer extremity thereof, the conical exterior surface of each of said run portions and the interior surface defining the bore of the run portion extending at a greater angle to each other on the branch side of the fitting than on the opposite side thereof, the thickness of the walls of the fitting decreasing in all directions from a maximum thickness in the region of each of the crotches formed by the convergence of said branch and run portions, and the thickness of the wall of each run portion, when measured in planes extending normal to the run portion intermediate the branch portion and the extremity of the run portion, being substantially greater on said branch side of the fitting than on said opposite side thereof.

2. A branched pipe fitting for welding, made from a section of pipe and having two run portions and at least one branch portion, which branch portion is drawn from a wall of said pipe section intermediate the ends of said section, the exterior of each of said run portions being of generally circular conical form and said run portions converging with each other at their larger ends so that the smaller ends of the run portions constitute the outer extremities thereof, the outer extremity of each of the branch and run portions having an outlet opening therein, the region of convergence between the larger ends of said run portions lying substantially in a plane extending normal to the run portions through the point of intersection of the axes of the run and branch portions and the outside diameter of the run portions decreasing progressively from said region of convergence to the extremities of the run portions, the walls of said fitting in the regions of the crotches formed by the convergence of the branch portion with the run portions having greater thickness than the walls of the remainder of the fitting so as to provide additional reinforcement in said regions, the thickness of the walls of said run portions, at least on the branch side of the fitting in the plane defined by the axes of the branch and run portions, progressively increasing from the outer extremities of said run portions to a maximum in said regions of the crotches, and the thickness of the walls of the run portions, measured in planes normal to the axis of the run portions, being substantially greater on the branch side of the run portions than on the sides of the run portions remote from said branch side.

3. A branched pipe fitting having two run portions and at least one branch portion, the exterior of each of which portions is of generally circular conical form, and all of which portions converge with each other at their larger ends to form a hollow body with the smaller ends of said portions constituting the outer extremities thereof and each of said extremities having an outlet opening therein, the region of convergence between the larger ends of said run portions lying substantially in a plane extending normal to the run portions through the point of intersection of the axes of the run and branch portions, the inner surfaces of said run portions being of generally circular conical contour for a substantial distance on each side of said plane, whereby at least a major part of said hollow body intermediate the ends thereof is of generally barrel shape, the walls of said fitting being of greatest thickness in the regions of the crotches formed by the convergence of the branch portion with the run portion, the thickness of the walls of the run portions, at least on the branch side of the fitting, progressively increasing from the outer extremities of said run portions to a maximum in said region of the crotches, and the walls of said run portions being of substantially greater thickness on the branch side of the run portions than on the closed sides thereof.

4. A branched pipe fitting having two run portions and at least one branch portion, the exterior of each of said run portions being of generally circular conical form and said branch portion and run portions converging with each other to form a hollow body with the smaller ends of the run portions constituting outer extremities thereof, the outer extremity of each of the branch and run portions having an outlet opening therein, the region of convergence between the larger ends of said run portions lying substantially in a plane extending normal to the run portions through the point of intersection of the axes of the run and branch portions, the outside and inside diameters of said run portions decreasing progressively from said region of convergence toward the extremties of the run portions, whereby a substantial part of said hollow body formed by said run portions and extending a substantial distance on each side of said region of convergence is of generally barrel shape exteriorly and interiorly, the walls of said fitting being of greatest thickness in the regions of the crotches formed by the convergence of the branch portion with the run portions, and the thickness of the walls of said run portions, at least on the branch side of the fitting, progressively increasing from the outer extremities of said run portions to a maximum in said regions of the crotches.

5. A branched pipe fitting comprising walls forming a hollow body portion at an intersection of run portions and of at least one branch portion, the outer surface of said branch portion and of said run portions at least in the regions adjacent said intersection substantially corresponding with conical surfaces of revolution, the distances from the outer surfaces of said run portions to the axis of the bore thereof being of successively greater length with decreasing distance from the center of said intersection, said surfaces of revolution of each said run portion having radii originating on axes of revolution inclined with respect to the axis of the bore of said run portions, the point of intersection of said axes of revolution being spaced in the direction of said branch portion from said axis of said bore, the inner and outer surfaces of said body portion being smoothly curved and including a crotch between each said run portion and said branch portion, the wall thickness decreasing in all directions from a maximum in the regions of said crotches, and the thickness of said run portions also gradually changing from a maximum thickness on the side from which said branch portion extends to a lesser thickness on the side remote from said branch portion and also decreasing lengthwise of the run portions on the branch side thereof.

6. A branched pipe fitting having two run portions and at least one branch portion, the exterior of each of which portions is of generally circular conical form, and all of which portions converge with each other at their larger ends to form a hollow body with the smaller ends of said portions constituting the outer extremities thereof and each of said extremities having an outlet opening therein, the region of convergence between the larger ends of said run portions lying substantially in a plane extending normal to the run portions through the point of intersection of the axes of the run and branch portions, the inner surfaces of said run portions being of generally circular conical contour for a substantial distance on each side of said plane, whereby at least a major part of said hollow body intermediate the ends thereof is of generally barrel-like shape, the wall thickness of the run portion on the branch side of the fitting increasing from each said extremity toward the central part thereof, and the wall thickness of the branch portion in the plane defined by the intersecting axes increasing from its outer end toward the run portion, with maximum wall thickness on the branch side of the fitting occurring in the regions of the crotches formed by the meeting of the walls of the run and branch portions.

7. A branched T fitting made from a section of pipe having a run portion and a branch portion drawn from the wall of the run portion intermediate the ends thereof, the exterior wall of the run portion having a shape such that the radii of curvature of the outside surface of the run portion progressively decreases toward the extremities from a maximum midway of the fitting, the resulting exterior surface of said run portion being generally in the shape of two circular cones meeting at the center of the fitting in the regions respectively of their larger cross-sectional areas, the wall thickness of said run portion increasing from the respective ends of the run portion on the branch side of the fitting to a maximum in the regions of the crotches formed by the meeting walls of the run and branch portions, the thickness of said regions of the crotches being greater than the thickness of any other part of the fitting, the wall of said run portion being of substantially greater thickness along the branch side than along the side opposite the branch side, and the internal surface of the run portion in the region of said branch portion defining a pair of conical surfaces and conforming in shape to the external surface thereof to provide flow channels which at least in part and toward the center of the fitting are of gradually increasing cross-sectional area to provide a generally barrel-shaped interior.

8. A branched fitting having two run portions made from a section of pipe and a branch portion drawn from the wall of said pipe intermediate its ends, the final shape of the interior walls of said run portions being in the form of two coaxial truncated right circular cones with the larger ends of said cones converging midway of the fitting, whereby the interior walls of the run portions are generally barrel-shaped, the final shape of the exterior walls of said run portions approximating truncated circular cones having their axes displaced toward the branch side of the fitting from the common axis of said two coaxial truncated cones to provide greater wall thickness of the run portions on their branch sides than on their opposite sides, the wall thickness of said run portions on the branch side of the fitting gradually increasing from the respective ends of the run portions toward the regions of the crotches formed by the meeting walls of the branch and run portions, with maximum wall thickness in the fitting occurring in said regions of the crotches.

9. A branched fitting having two run portions made from a section of pipe and a branch portion drawn from the wall of said pipe intermediate its ends, the final shape of the interior walls of said run portions being in the form of two coaxial truncated right circular cones with the larger ends of said cones converging midway of the fitting, whereby the interior of the run portions is generally barrel-shaped, the final shape of the exterior walls of said run portions approximating truncated circular cones having axes displaced toward the branch side of the fitting from the common axis of said two coaxial truncated cones to provide greater wall thickness of the run portions on their branch sides than on their opposite sides, the wall thickness of said run portions on the branch side of the fitting gradually increasing from the respective ends of the run portions toward the regions of the crotches formed by the meeting walls of the branch and run portions, and said branch portion having a substantially cylindrical interior wall and an exterior wall in the shape of a truncated right circular cone to provide, in the plane defined by the intersecting axes of the run and branch portions, gradually increasing wall thickness from the outer end of the branch portion toward said regions of the crotches with maximum wall thickness in the fitting occurring in said regions of the crotches.

10. A branched T fitting made from a section of pipe having a run portion and a branch portion drawn from the wall of the run portion intermediate the ends thereof, the exterior wall of the run portion having a shape such that the radii of curvature of the outside surface of the run portion progressively decreases toward the extremities from a maximum midway of the fitting, the resulting exterior surface of said run portion being generally in the shape of two circular cones meeting at the center of the fitting in the regions respectively of their larger cross-sectional areas, the wall thickness of said run portion increasing from the respective ends of the run portion on the branch side of the fitting to a maximum in the regions of the crotches formed by the meeting walls of the run and branch portions, the thickness of said regions of the crotches being greater than the thickness of any other part of the fitting, the walls of said run portion being of substantially greater thickness on the branch side of the run portion than on the closed sides thereof, the internal surface of the run portion in the region of the branch defining a pair of conical surfaces and conforming in shape to the external surface thereof to provide flow channels which at least in part and toward the center of the fitting are of gradually increasing cross-sectional area to provide a generally barrel-shaped interior, and the fitting in the regions extending lengthwise of the run portion and defined by a plane normal to the axis of the bore of the branch portion through the point of intersection of that axis with the axis of the bore of the run portion having a substantially uniform wall thickness.

ARTHUR R. C. MARKL.

References Cited in the file of this patent

UNITED STATES PATENTS

| Number | Name | Date |
|---|---|---|
| 391,445 | Williams | Oct. 23, 1888 |
| 396,080 | Gilliam | Jan. 15, 1889 |
| 1,182,360 | Dies | May 9, 1916 |
| 1,255,562 | Olson | Feb. 5, 1918 |
| 1,989,608 | Reed | Jan. 29, 1935 |
| 2,138,199 | Wendel | Nov. 29, 1938 |
| 2,157,274 | Williams | May 9, 1939 |
| 2,280,255 | Parker | Apr. 2, 1942 |
| 2,290,965 | Hodafp et al. | July 28, 1942 |
| 2,360,359 | Meyers | Oct. 17, 1944 |
| 2,381,890 | Ebbets | Aug. 14, 1945 |

FOREIGN PATENTS

| Number | Country | Date |
|---|---|---|
| 596,289 | Germany | Apr. 20, 1930 |